United States Patent [19]

Oliver et al.

[11] Patent Number: 5,313,610
[45] Date of Patent: May 17, 1994

[54] DIRECT MEMORY ACCESS CONTROL DEVICE FOR USE WITH A SINGLE N-BIT BUS WITH MOF THE N-BITS RESERVED FOR CONTROL SIGNALS AND (N-M) BITS RESERVED FOR DATA ADDRESSES

[75] Inventors: David C. Oliver, Maple Heights; John F. Vesel, Willowick; Michael J. Petrillo, Euclid; James M. Kapcio, Cleveland, all of Ohio

[73] Assignee: Picker International, Inc., Highland Hts., Ohio

[21] Appl. No.: 725,549

[22] Filed: Jul. 3, 1991

[51] Int. Cl.$^5$ ............................................. G06F 13/28
[52] U.S. Cl. ............................ 395/425; 364/DIG. 1; 364/242.3; 364/242.31; 364/240; 364/DIG. 2; 364/238.3
[58] Field of Search ............... 364/200 MS, 900 MS, 364/400 MS, 425 MS

[56] References Cited

U.S. PATENT DOCUMENTS

| | | | |
|---|---|---|---|
| 4,004,283 | 1/1977 | Bennett et al. | 395/725 |
| 4,030,079 | 6/1977 | Bennett et al. | 395/325 |
| 4,122,520 | 10/1978 | Adamchick et al. | 395/425 |
| 4,722,051 | 1/1988 | Chattopadhya | 395/425 |
| 4,775,928 | 8/1988 | Kendall et al. | 395/425 |
| 4,821,170 | 4/1989 | Bernick et al. | 395/275 |
| 4,847,750 | 7/1989 | Daniel | 395/425 |
| 4,878,166 | 10/1989 | Johnson et al. | 395/425 |
| 4,918,597 | 4/1990 | Krishnan et al. | 395/425 |
| 5,056,015 | 10/1991 | Baldwin et al. | 395/500 |
| 5,058,051 | 10/1991 | Brooks | 395/425 |
| 5,111,425 | 5/1992 | Takeuchi et al. | 395/425 |

OTHER PUBLICATIONS

M. Morris Mano, computer system architecture, 1982, 2nd edition, pp. 403-473.

Primary Examiner—Joseph L. Dixon
Assistant Examiner—Matthew M. Kim
Attorney, Agent, or Firm—Fay, Sharpe, Beall, Fagan, Minnich & McKee

[57] ABSTRACT

A DMA control device (10) is connected with an n-bit address bus (12) by way of a bidirectional internal n-bit bus (14). The m most significant bits of signals received on the bidirectional bus (14) are reserved for carrying codes which identify or enable the DMA device to respond, to generate a load signal, to generate a count signal, and to generate an output signal. The remaining bits are reserved for address data. The load signal causes the remaining bit addresses to be loaded into counters (22) or registers (40). The count signal causes the counters (22) or a latched incrementor (44) to increment. The output signal controls three-state buffers (24, 42, 46) which cause the current address to be outputted on the bidirectional bus. In this manner, the DMA control device has only a single bus and in the embodiment of FIG. 2 replaces the counter array with a register array.

8 Claims, 2 Drawing Sheets

DIRECT MEMORY ACCESS CONTROL DEVICE FOR USE WITH A SINGLE N-BIT BUS WITH MOF THE N-BITS RESERVED FOR CONTROL SIGNALS AND (N-M) BITS RESERVED FOR DATA ADDRESSES

BACKGROUND OF THE INVENTION

The present invention relates to the art of data handling. It finds particular application in conjunction with DMA memory address generators for handling large blocks of image data for medical and diagnostic scanners and will be described with particular reference thereto. However, it is to be appreciated that the invention is also applicable to DMA controllers and address generators for other purposes, such as refreshing displayed images, writing data into DRAM, VRAM or other memories, or writing data directly from DRAM, VRAM, or other memories, and the like.

Heretofore, a processor generated an address for each element of data which was moved from one location to another, e.g., each element of data stored in or retrieved from a memory. When moving large blocks of data, such as images, generating the many addresses consumed a large portion of the processor's time. To free the processor for other tasks, direct memory access (DMA) controllers were used to generate the series of addresses. This enabled the data to be stored, retrieved, or otherwise moved without the intervention of the microprocessor or other central processing unit. This freed the processor to perform other functions expediting the data transfer process.

Heretofore, DMA controller devices have had both a data bus for receiving instructions and an address bus for outputting the series of addresses. In a 32 bit system, for example, the data and address buses each had 32 parallel leads or pin sets for interconnection with associated hardware. The DMA controller included a logic or processor portion, a starting address register, and a transfer size or ending address register connected with the data bus. The data bus carried an identification or enable signal which enabled the DMA to start generating the sequence of addresses, the start address, and an indication of the data block size or end address. The starting address and the data block size or end address were loaded in the corresponding registers. A series of counters were loaded with start address and the data block size or end address. The counters were clocked in synchronization with an external event indicative of the data movement to generate an address for each moved data element. With each cycle, the counters were incremented such that each clocking generated the next address.

One drawback of the prior art DMA systems is that they became hardware cumbersome and expensive with larger numbers of bits. A first or data bus was required to pass the DMA starting address and transfer length and a second or address bus was required to output a sequential DMA addresses. The DMA control circuit interfaced with a large number of signal lines in the two complete buses, requiring large printed circuit board surface area dedicated to signal routing. This increased printed circuit board complexity. Further, the controller itself had to be large to accommodate the large number of inputs and outputs.

Another problem with the prior art is that the multiple counters are expensive in logic resources, which expense increases with increasing address ranges that require more complex counter designs.

The present invention contemplates a new and improved DMA architecture which overcomes the above-referenced problems and others.

SUMMARY OF THE INVENTION

In accordance with one aspect of the present invention, a single bus is utilized to carry both the initializing data and the generated addresses.

In accordance with another aspect of the present invention, a common bus drives a register file whose outputs, in turn, drive the bus via three-state buffers. An address incrementor is provided for calculating the next address.

One advantage of the present invention is that the size and complexity of the DMA controller device is reduced.

Another advantage of the present invention is that it is less expensive in logic resources. Particularly, multiple counters are eliminated in favor of less expensive simple registers and a single latched incrementor.

Other advantages of the present invention reside in the reduction of the signal lines, increased circuit board packing density, reduced interconnect complexity.

Yet another advantage of the present invention is that greater functionality can be fit into smaller chips.

Still further advantages will become apparent upon reading and understanding the following detailed description.

BRIEF DESCRIPTION OF THE DRAWINGS

The invention may take form in various components and arrangements of components. The drawings are only for purposes of illustrating the preferred embodiment and are not to be construed as limiting the invention.

DETAILED DESCRIPTION OF THE PREFERRED EMBODIMENT

Figure 1:
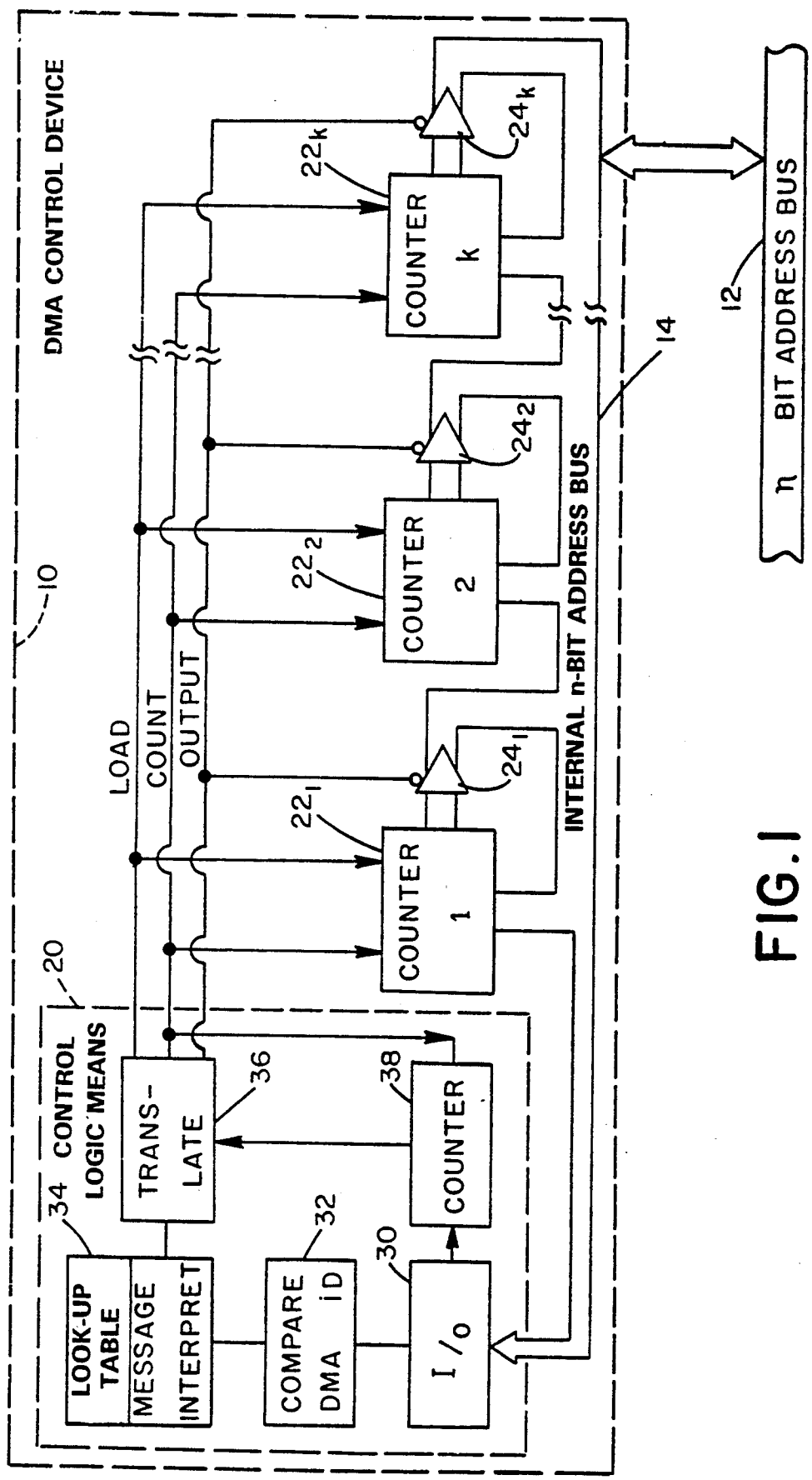
FIG. 1 illustrates a DMA control device with a single bidirectional bus in accordance with the present invention.

With reference to FIG. 1, a DMA control device 10 receives a starting address, a transfer count length, and to enable data from an n-bit address bus 12 on an internal bus 14. In the preferred embodiment, the address and internal buses are each 32-bit buses, i.e., has 32 parallel electrical paths.

In a CT scanner, like many applications, the DMA controller devices, the data, and the addresses are all much less than 32 bits. More specifically, their sum is less than 32 bits.

This enables the m most significant bits to be reserved for an identification of the DMA or other hardware to which a message is addressed and an appropriate messages, e.g. an identification of a starting address and a transfer count length. In the CT scanner embodiment in which there are relatively few hardware components to be identified and each of which has relatively few operations or commands to be identified, the 4 most significant bits are sufficient. This reserves 28 bits for the address data. The reserved 28 bits for addresses is more than sufficient in CT scanners. Thus, more than 4 bits can be utilized, if necessary, to carry the DMA controller and other component identifications and messages.

The DMA controller device includes a control logic means 20 which examines the m most significant bits to determine the significance of the incoming data. If the signal on the m most significant bits indicates that the signal is addressed to the present DMA controller and that it is conveying starting address information, then the logic control means 20 causes counters $22_1$-$22_k$ to load the starting k addresses. Similarly, the logic control device 20 interprets the data to determine when the counter should step or increment. In response to a clock signal which indicates that the counter should increment, the control logic sends out a counter signal to each of counters $22_1$-$22_k$. Analogously, in response to each clock signal the logic control means 20 send an output signal to three-state devices $24_1$-$24_k$ to cause the current count of the counters $22_1$-$22_k$ to be placed on the n−m least significant bits of the address bus 12.

The logic control means 20, by way of example, includes an I/O means 30 for receiving the data from the bus. A comparing means 32 compares the m bits of the received data which carry a device identification code with an identification code of the DMA control device 10 to determine if the device should respond to this data. If the DMA control device is not addressed, it remains dormant. If the present DMA device is addressed, then those of the remaining m bits which carry messages are compared with a plurality of preselected messages. For example, the message bits may be used to address a look up table 34 which is pre-programmed with the meaning of each available message bit combination. A translating means 36 translates the output of the look up table or message comparing means 34 in to an appropriate one of the load, count, and output signals. A counter means 38 may be loaded with the message length information and decremented by each count or output signal to disable the control logic when the prescribed transfer count length has been obtained. Other hardware and software implementations of the control logic to produce these and additional functions are also contemplated.

Figure 2:
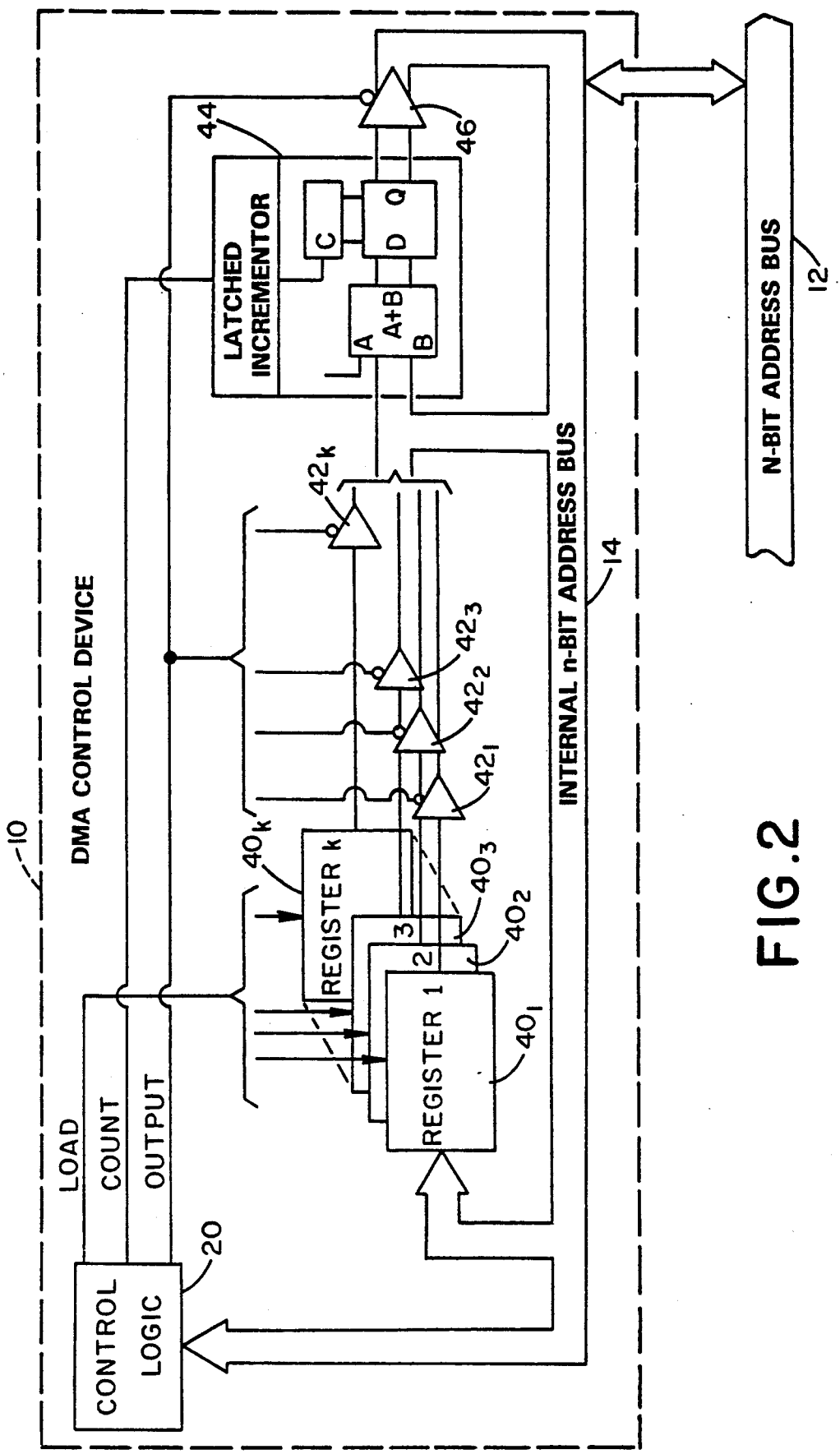
FIG. 2 shows another DMA controller device in accordance with the present invention in which an array of registers replace a corresponding array of counters.

With reference to FIG. 2, the bidirectional internal DMA address bus 14 drives a series of registers $40_1$-$40_k$. The logic control means 20 controls the array of registers to cause them to load starting addresses in response to receiving an identification of a present DMA and an indication that the accompanying data on the n−m least significant bits of the bidirectional bus line are indicative of an initial address.

Outputs from the registers $40_1$-$40_k$ drive the bidirectional bus 14 via an array of three-state buffers $42_1$-$42_k$. A latched incrementor 44 generates successive addresses. The latched incrementor is driven by the bidirectional bus 14 and drives the bidirectional bus via three-state buffers 46.

Each register in the file is selected and initialized via the bidirectional bus 14. When the control logic 20 allocates one of the registers to a channel, the register's contents are placed on the bus to provide an address for a data transfer. Simultaneously, the latched incrementor 44 calculates the next address. Additional data transfers in immediately following clock cycles receive their address from the latched incrementor 44, which is incremented with each clock cycle. Following the last transfer before an interrupt, the value in the latched incrementor is conveyed via the bidirectional bus line 14 to the corresponding register to update the address value in that register.

For multiple channels, the other registers are also initialized. During DMA control operations, a CPU or other external logic means selects a starting address for an appropriate one(s) of the registers $40_1$-$40_k$.

Typically, DMA operations from a single channel do not complete without relinquishing control of the bus 12 to another channel, the processor, or due to flow control of the data being moved between the data source and the data destination. Each time the channel is interrupted, the value in the latched incrementor 44 is reloaded into the corresponding register.

The next time that the same channel is selected, the updated value in the register is placed on the bus providing the address for the data being transferred and loading the latched incrementor 44. Optionally, the control logic means 20 may keep a record of the last channel selected and compare it with the channel currently selected. If the same channel is selected again, the control logic means can cause the value contained in the incrementor to be driven onto the address bus without being reloaded from the corresponding register. If the channels are not the same, then the register file is used as the first intermediate starting address and to load the latched incrementor 44.

Although the latched incrementor preferably provides a linear counting sequence, it is contemplated that non-linear counter sequences may be advantageous in some data transfers.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A direct memory access control device for interconnection with a single n-bit address bus from which the direct memory access control device receives and on which the direct memory access control device sends both (n−m) bit data addresses and control signals of up to m bits, where n is an integer and m is a positive integer greater than 0 and less than n, the device comprising:

a single internal n-bit bidirectional bus;

a plurality of address means for holding one of the (n−m) bit data addresses, the plurality of address means being connected with the internal n-bit bidirectional bus to be driven by the internal n-bit bidirectional bus;

a plurality of three-state buffers, each three-state buffer being connected between one of the plurality of address means and the single internal n-bit bidirectional bus for providing the held one of the (n−m) bit data addresses to the internal n-bit bidirectional bus;

an internal control logic means connected with the plurality of address means and the internal n-bit bidirectional bus for examining m bits of the internal n-bit bidirectional bus for the control signals, the control logic means controlling the plurality of address means to (i) load an initial (n−m) bit address from the internal n-bit bidirectional bus and (ii) increment the held one of the (n−m) bit addresses to the plurality of address means which is provided to the internal n-bit bidirectional bus by the plurality of three-state buffers.

2. The direct memory access control device as set forth in claim 1 wherein the plurality of address means includes a plurality of counters and wherein the control logic means selectively generates (1) load signals for causing the plurality of counters to load the initial (n−m) bit address from the internal n-bit bidirectional bus, (2) count signals for causing each of the plurality of counters to increment, and (3) output signals for causing the address in each counter to be output onto the internal n-bit bidirectional bus.

3. The direct memory access control device as set forth in claim 1 wherein the plurality of address means includes an array of registers.

4. A direct memory access control device comprising:
an internal n-bit bidirectional bus, where n is an integer;
a plurality of registers for holding (n−m) bit data addresses, the plurality of registers being connected with the internal n-bit bidirectional bus to receive the (n−m) bit data addresses therefrom, where m is an integer greater than 0 and less than n;
a plurality of three-state buffers, the plurality of three-state buffer being connected between the plurality of registers and the internal n-bit bidirectional bus for providing the held (n−m) bit data addresses to the plurality of three-state buffers;
a latched incrementor, the plurality of registers being connected to the latched incrementor by the plurality of three-state buffers for selectively loading the (n−m) bit data addresses from the plurality of registers into the latched incrementor, the latched incrementor being interconnected with the internal n-bit bidirectional bus by a second three-state means for conveying contents of the latched incrementor to the internal n-bit bidirectional bus;
a internal control logic means connected with the plurality of registers and the internal n-bit bidirectional bus for examining m bits of the internal n-bit bidirectional bus for control signals, the control logic means controlling the plurality of registers to (i) load an initial (n−m) bit address from the internal n-bit bidirectional bus and (ii) increment the held one of the (n−m) bit addresses which is provided to the internal n-bit bidirectional bus by the latched incrementor.

5. The direct memory access control device as set forth in claim 4, wherein the control logic means generates load, count, and output signals in response to the examined m bits and further including electrical connection paths for connecting the control logic means with a register array for selectively conveying the load signals to the register array, for connecting the control logic means with the latched incrementor for selectively conveying the count signal to the latched incrementor, and for connecting the control logic means with the three-state buffers for selectively conveying the output signal to the three-state buffers.

6. A DMA control device comprising:
a single bidirectional internal n bit bus, where n is an integer, m of the n bits being reserved for control signals and a remainder of the n-bits being available for data addresses;
an address holding means for holding data addresses which data addresses have less than n bits so as to be conveyable on said remainder of the n-bits of the bidirectional internal n-bit bus, the address holding means being connected with the remainder of the n bits of the bidirectional internal n bit bus which is reserved for data addresses;
a plurality of three-state buffers connected with the address holding means and with the bidirectional internal n bit bus for providing an address conveying path from the address holding means to the bidirectional internal n bit bus;
a internal control logic means connected with the bidirectional bus, the control logic means receiving control signals from the m bits of the bidirectional internal n bit bus reserved for control signals and generating in response to the control signals (1) load signals for causing the address holding means to load starting addresses from said remainder of the n bits of the bidirectional internal n bit bus, (2) count signals for causing the loaded addresses to be incremented, and (3) output signals for causing the three-state buffers to output the incremented addresses to be output on the bidirectional internal n bit bus.

7. The DMA control device as set forth in claim 6 wherein the address holding means includes an array of counters.

8. The DMA control device as set forth in claim 6 wherein the address holding means includes an array of registers, the registers being connected with a latched incrementor means by the three-state buffers, the latched incrementor means being connected to the bidirectional internal n bit bus by a second three-state buffer means.

* * * * *